Jan. 26, 1971    J. P. RICH ET AL    3,557,583
PULP STRAINER
Filed Sept. 10, 1968    2 Sheets-Sheet 1
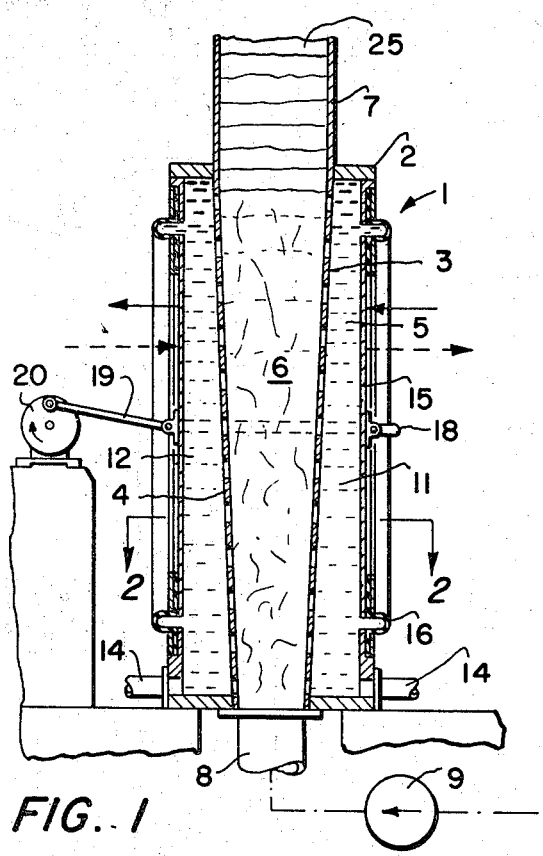
FIG. 1
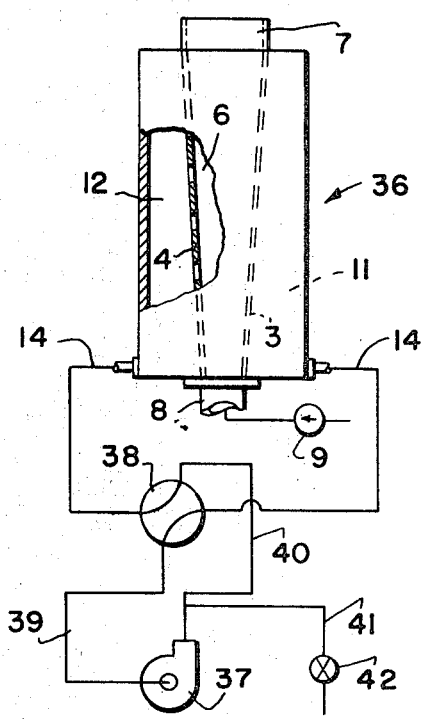
FIG. 5
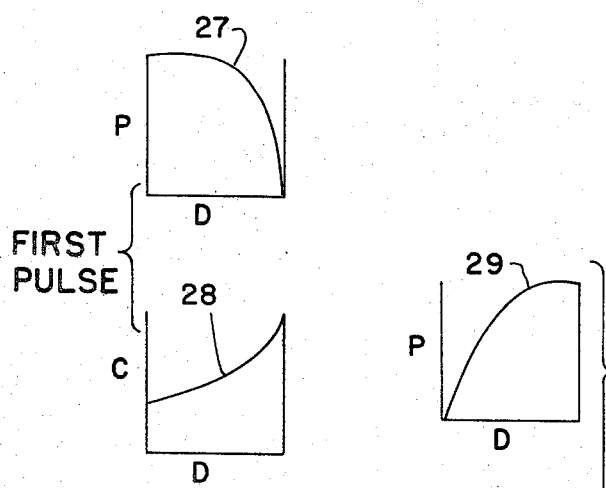
FIG. 2
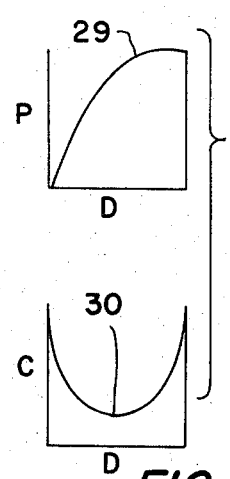
FIG. 3
FIG. 4
INVENTORS
JOHN P. RICH
LAWRENCE A. CARLSMITH
BY
David W. Tilbott
ATTORNEY

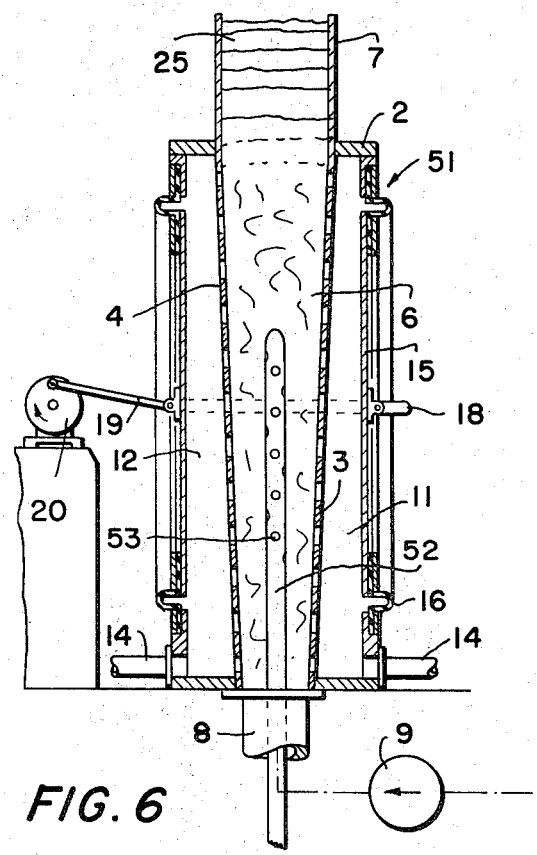
FIG. 6
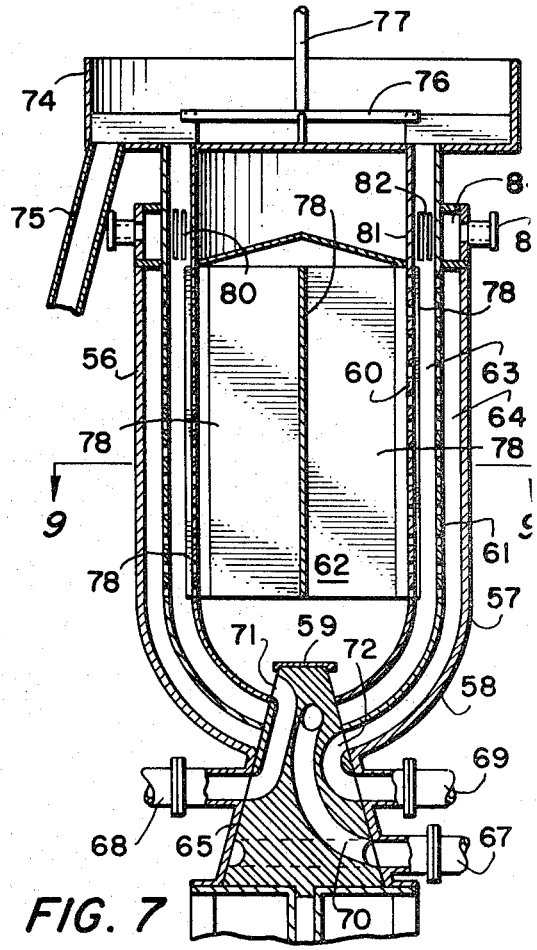
FIG. 7
FIG. 8
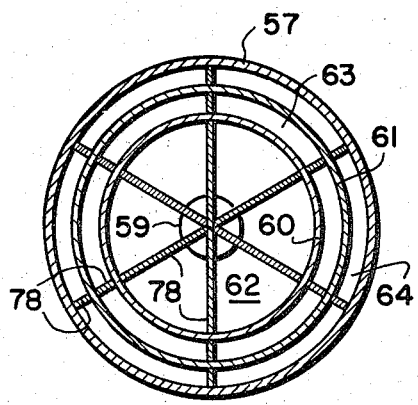
FIG. 9
INVENTORS
JOHN P. RICH
LAWRENCE A. CARLSMITH
BY
David W. Tilbott
ATTORNEY United States Patent Office 3,557,583
Patented Jan. 26, 1971

3,557,583
PULP STRAINER
John P. Rich, Nashau, and Lawrence A. Carlsmith, Amherst, N.H., assignors to Improved Machinery Inc., Nashua, N.H., a corporation of Delaware
Filed Sept. 10, 1968, Ser. No. 758,749
Int. Cl. D21c 9/06
U.S. Cl. 68—181                                      18 Claims

ABSTRACT OF THE DISCLOSURE

An apparatus for filtering pulp from a liquid suspension including feeding the suspension of pulp between a pair of spaced screens and applying pressure impulses to the screens to progressively propel the pulp mat across the screens while the liquid filtrate drains through the screens. Means for creating the pressure pulses include varying the volume of chambers behind the screens and intermittently connecting a pump to the chambers behind the screens.

BACKGROUND OF INVENTION

This invention relates generally to the art of extracting liquid from a liquid suspension of solid material and more particularly to the art of separating liquid and fibrous material such as pulp used in the paper manufacturing industry.

Conventional apparatus for filtering pulp from liquid generally use a screen for collecting the pulp and a mechanical means such as a doctor for periodically removing the accumulated pulp from the screen. The use of doctor blades and the like is undesirable because they create wear and maintenance problems, absorb power, complicate the construction of the apparatus and increase the manufacturing and operation costs of the apparatus.

SUMMARY OF INVENTION

The principal object of this invention is to eliminate the need for mechanical means for removing the filtered material from the filter screen.

Other important objects are: to provide a filtering apparatus which separates solids from a liquid and progressively transports the collected solids from a screen as they collect thereon; to provide a novel apparatus and method of filtering solids from a liquid; and to provide a novel apparatus for filtering pulp which can also be used as a thickener and a pulp washer; to provide a novel apparatus for progressively transporting pulp from a filtering screen.

In general, the foregoing objects are met by flowing a liquid suspension between a pair of spaced filtering screens and applying a series of pressure pulses acting in opposite directions between the screens whereby the mat of solids collected on the screens is periodically lifted from the screens. Each time the mat is lifted from the screens, the force of the incoming suspension behind the mat will act to propel it a short distance across the screen, thus resulting in the mat moving across the screens in a series of minute steps. This method has been found to maintain the screens exceptionally clean while eliminating the maintenance and other problems generally associated with the use of scrapers and other forms of doctors.

BRIEF DESCRIPTION OF DRAWINGS

The invention is specifically described in connection with accompanying drawings wherein:

FIG. 1 is an elevational section of an embodiment of apparatus for use in filtering pulp and illustrating the principles of this invention;

FIG. 2 is a horizontal section taken on the line 2—2 in FIG. 1;

FIGS. 3 and 4 are curves illustrating the alternately acting impulses created in the apparatus of FIG. 1;

FIG. 5 is an elevational section similar to FIG. 1 showing a second embodiment of the apparatus;

FIG. 6 is an elevational section showing an embodiment of the apparatus being used as a pulp washer;

FIG. 7 is a vertical section of another embodiment containing a cylindrical filtering zone and a rotary pulsing valve;

FIG. 8 is a fragmentary section showing the rotary valve in an alternate position from that shown in FIG. 7; and FIG. 9 is a horizontal section taken on the line 9—9 in FIG. 7.

DESCRIPTION OF PREFERRED EMBODIMENTS

The pulp filtering apparatus 1 shown in FIGS. 1 and 2 includes a casing 2 enclosing a pair of spaced vertically extending filter screens 3 and 4 positioned to diverge in an upward direction. The two screens 3 and 4 are interconnected by side walls 5 to form a tapered filtering zone 6. The filtering zone 6 is joined to the lower end of a discharge pipe 7 having parallel walls. The lower end of the filtering zone 6 is connected to a stock feed pipe 8 which is joined to a feed pump 9 that feeds pulp stock under a substantially constant pressure.

The casing 2 is arranged to provide respective chambers 11 and 12 behind the screens 3 and 4. Each of the chambers 11 and 12 is connected to a drain pipe 14 for conveying filtrate from the chambers. Each chamber includes a movable diaphragm plate 15 attached to the remainder of the casing 2 by a flexible diaphragm or membrane 16 which allows the plate 15 to move inward and outward to vary the volume of its chamber. As the plate 15 moves inward, it will increase the pressure in its chamber (thus applying a pressure pulse thereto) and when it moves outward, it will apply a suction to its chamber. It should be noted that the two chambers 11 and 12 are full of liquid during the operation of the apparatus.

The two diaphragm plates 15 are interconnected by a link 18 which forces them to travel in unison while remaining stationary relative to each other. One of the plates 15 is connected by an arm 19 to a reciprocating means such as the eccentric 20 driven by a motor which causes the plates 15 to reciprocate inward and outward. Due to the fact that the two diaphragm plates 15 are interconnected to move in unison, one plate 15 will apply a pressure pulse to its chamber while the other is applying a suction. Thus, the above linkages 18 and 19 will result in periodic pulses being alternately applied to the chambers 11 and 12.

The stock fed into the filtering zone 6 is generally a liquid suspension of wood pulp which can vary by weight from .5% to 15%. As the stock enters the filtering zone 6 the liquid in the stock flows as filtrate through the screens 3 and 4 into the chambers 11 and 12 whence it drains into the drain pipes 14. The pulp remaining after the removal of the filtrate is termed a pulp mat 25. The periodic pressure pulses applied alternately to the chambers 11 and 12 serve to lift the pulp mat 25 from alternate screens whereby the feed pressure of the stock entering the filtering zone will propel the mat 25 in a series of minute steps upwardly across the screens 3 and 4.

The discharge pipe 7 has parallel walls in order to provide a resistance to upward movement of the pulp mat 25 through it so that the feed or impulse pressure on the mat 25 does not escape through the discharge pipe 7. It is believed that the discharge pipe 7 is necessary to insure that the pressure pulses properly lift the mat 25 from the screens 3 and 4.

In explaining our theory of the operation of the above described apparatus, we assume that the apparatus is being started and that the first pressure impulse is applied to the left chamber 12, as shown in FIG. 1. FIG. 3 illustrates this first pressure impulse as curve 27.

In the curve 27, the ordinate P is pressure and the abscissa D represents the thickness of the pulp mat 25 which corresponds to the distance between the two screens 3 and 4. The curve 27 indicates that as the pressure pulse penetrates the pulp mat 25 from the left chamber, it rapidly drops to zero pressure near the remote surface of the mat 25.

The foregoing pressure pulse 27 rearranges the consistency of the pulp mat 25 to follow the curve 28, also in FIG. 3. The ordinate C of the curve 28 represents consistency or percent of pulp in the mat. The curve 28 illustrates that the pressure impluse 27 forces a portion of the pulp toward the right screen 3 to cause the consistency to progressively increase towards the screen 3.

FIG. 4 illustrates the pressure curves 29 and consistency curves 30 during the second and additional pressure impulses. The pressure impulse curve 29 is similar to the curve 27 except that it is acting in the opposite direction through the pulp mat 25. However, the consistency curve 30 assumes a U-shape indicating that the consistency is higher at both outer surfaces of the mat than in its center of middle. It is believed that this higher surfaces consistency protects the outer surfaces of the mat from disintegrating under the alternate vacuum impulses. Such disintegration would result in large amounts of the mat fibers flowing through the screens 3 and 4 with the filtrate which, of course, is undesirable. This is the reason why we believe our invention operates satisfactorily to extract the filtrate from the mat without clogging the fiber screens 3 and 4 and without a high rate of fiber loss through the screens 3 and 4.

FIG. 5 EMBODIMENT

This embodiment 36 differs from the first embodiment by using a centrifugal pump 37 to create the pressure and suction impulses. The drain lines 14 of the opposite chambers 11 and 12 are connected to one side of a rotary four-way valve 38. Also connected to the other side of the valve 38 are the suction line 39 and the discharge line 40 of the pump 37. A motor (not shown) rotates the valve 38 to connect the suction and discharge lines 37 and 38 alternately to the two drain pipes 14, 14, causing pressure and suction impulses to be applied alternately to the two chambers 11 and 12. A filtrate drain line 41 containing a valve 42 is connected to the discharge line 40 ahead of the valve 38 to drain a portion of the filtrate from the fluid circulating through the pump 37. This embodiment 36 operates in a manner identical to the first embodiment.

FIG. 6 EMBODIMENT

The embodiment 51 in FIG. 6 illustrates the use of the FIG. 1 apparatus as a pulp washer. The only difference between the FIG. 6 embodiment and FIG. 1 is the addition of the spray pipe 52 extending vertically upwardly in the center of the filtering zone 6 and having a plurality of spray orifices 53 to inject washing fluid into the pulp mat 25. Instead of injecting the washing liquid through a pipe located centrally in the filtering zone 6, it is possible to inject it through one of the filter screens 3 and 4 into the pump mat 25.

FIG. 7 EMBODIMENT

FIG. 7 illustrates a circular embodiment 56 containing a cylindrical casing 57. The casing 57 has a rounded bottom 58 which encircles a rotary cone-shaped valve 59. The casing 57 contains an inner circular filter screen 60 and an outer filter screen 61 spaced from each other and the casing 57 to form an inner chamber 62, a filtering zone 63 and an outer chamber 64. The filtering zone 63 receives a continuous supply of pulp while the two chambers 62 and 64 receive alternate pressure and suction impulses resulting in an operation similar to the earlier embodiments.

The rotary valve 59 is driven by a motor (not shown) and rotates in a valve housing 65 which is connected to a pulp stock supply pipe 67 and the suction and discharge pipes 68 and 69 of a pulsing pump (not shown). FIGS. 7 and 8 show a stock passage 70 in the valve 59 which continuously interconnects the stock pipe 67 with the filter zone 63 as the valve rotates. In addition, the valve 59 includes an inner chamber passage 71 and an outer chamber passage 72, each of which interconnects its chamber alternately with the suction and discharge pipes 68 and 69 as the valve 59 rotates. FIGS. 7 and 8 illustrate alternate positions of the rotary valve 59 delivering pulses to the chambers 62 and 64.

After passing through the filter zone 63, the stock moves through a short non-pulsed zone 80 before being discharged from the top end of the annular space. The non-pulsed zone 80 lies immediately above the top edges of the screens 60 and 61. The non-pulsed zone 80 is bordered by an inner imperforate annular plate 81 attached to the top edge of the inner screen 60 and an outer grid 82 formed by a plurality of circumferentially spaced bars. The outer side of the grid 82 is enclosed by an annular drain compartment 84 connected to drain conduits 85' for discharging water from the compartment 84. The non-pulsed zone 80 removes any liquid from the stock that may remain after passing through the filter zone 63.

After the pulp stock rises through the filter zone 63 and is formed into a mat which passes through the non-pulsed zone 80, the mat is discharged from the top 73 end of the non-pulsed zone. The top 73 contains an enlarged circular tray 74 for receiving the pulp mat. The tray 74 is connected to a pulp discharge pipe 75 which conveys the pulp mat away from the apparatus. FIG. 7 shows a rotary scraper or doctor 76 mounted on a shaft 77 which is driven by a motor (not shown) to move the pulp mat to the discharge pipe 75.

FIGS. 7 and 9 show several radially extending partitions 78 extending from the axis of the casing 57 through the screens 60 and 61 to the outer wall to reinforce the structure.

While several embodiments of this invention are illustrated and described, it should be understood that this invention is not limited merely to the particular structure described in the specification and shown in the drawings but may include other embodiments and modifications utilizing the concepts and teachings of the invention.

What is claimed is:
1. A pulp treatment apparatus comprising:
   a container adapted to contain a vertically upward moving mass of pulp;
   means for feeding pulp into the container for causing said pulp to flow upwardly in the container;
   a pulp treatment zone in said container and a pair of horizontally spaced vertically extending perforated drain screens located in said zone with their inner surfaces engaging said pulp; and
   means for applying periodic pressure pulses to the inner surface of each of said screens.
2. An apparatus for draining a liquid suspension of solid material comprising:
   a container for enclosing a moving flow of material suspended in a liquid and containing a drain zone;
   a pair of spaced perforated screens located in said zone with their inner surfaces engaging said suspension and having their outer surfaces cooperating with drain means for receiving liquid flowing through said screens; and
   means for applying periodic pressure pulses to the liquid draining through each of said screens.
3. The apparatus of claim 2 wherein:
   said pair of screens are located on opposite sides of said drain zone and are positioned to face each other across said drain zone.

4. The apparatus of claim 3 wherein:
said pair of screens diverge from each other in the direction of the flow of said solid material to form a drain zone having a progressively increasing cross-sectional area in the direction of flow of said material through said drain zone.

5. The apparatus of claim 3 wherein:
said pair of screens have their outer surfaces enclosed by respective drain chambers connected to respective drainage conduits.

6. The apparatus of claim 5 wherein:
said pulses are created by means varying the volumes of said chambers.

7. The apparatus of claim 5 wherein:
said pulses are created by periodically interconnecting a pump to the drain liquid contained in each of said chambers.

8. The apparatus of claim 3 wherein:
said pressure pulses are applied alternately to each of said screens.

9. The apparatus of claim 8 wherein:
each pressure pulse acts in the opposite direction from that of the preceding pressure pulse.

10. The apparatus of claim 9 wherein:
each pressure pulse applied to one screen is occupied by a simultaneous suction pulse applied to the opposite screen.

11. The apparatus of claim 3 wherein:
said drain zone is annularly shaped with an inner screen circling the inside of said drain zone and an outer screen surrounding the drain zone.

12. The apparatus of claim 11 wherein:
said annular drain zone is connected at one end to a rotating inlet member supplying said liquid suspension to said zone.

13. The apparatus of claim 12 wherein:
said rotating inlet member cotnains a port connected to a pressure source and alternately connects said port to the inner screen and then the outer screen to create pressure pulses in said drain zone acting in alternate directions between said screens.

14. The apparatus of claim 3 including:
means for supplying wash liquid to said suspension while it passes through said drain zone.

15. The apparatus of claim 14 wherein:
said means for supplying wash liquid extends through the inlet end of said drain zone and centrally along said drain zone.

16. The apparatus of claim 2 wherein:
said means for applying periodic pressure pulses is located outside of said drain zone and in contact with the liquid that has drained through said screens.

17. The apparatus of claim 16 wherein:
said means for applying periodic pressure pulses is located in said drain means.

18. The apparatus of claim 5 wherein:
said means for applying periodic pressure pulses is located outside of said drain zone and applies said pulses to the draining liquid in said drain chambers.

References Cited

UNITED STATES PATENTS

| | | | |
|---|---|---|---|
| 3,237,773 | 3/1966 | Laakso | 68—181X |
| 3,298,209 | 1/1967 | Laakso | 68—181 |
| 3,313,240 | 4/1967 | Bentor | 68—190X |

WILLIAM I. PRICE, Primary Examiner

U.S. Cl. X.R.

68—190; 210—19, 349